United States Patent
Lindau

(10) Patent No.: US 7,785,552 B2
(45) Date of Patent: Aug. 31, 2010

(54) METHOD AND SYSTEM OF CONTROLLING SULFUR OXIDES IN FLUE GAS FROM COAL OR OIL-FIRED BOILERS

(75) Inventor: Leif A. V. Lindau, Arlov (SE)

(73) Assignee: ALSTOM Technology Ltd, Baden (CH)

( * ) Notice: Subject to any disclaimer, the term of this patent is extended or adjusted under 35 U.S.C. 154(b) by 37 days.

(21) Appl. No.: 11/693,934

(22) Filed: Mar. 30, 2007

(65) Prior Publication Data

US 2008/0241037 A1    Oct. 2, 2008

(51) Int. Cl.
*B01D 53/50* (2006.01)
*B01D 53/81* (2006.01)
(52) U.S. Cl. ............................ 423/242.1; 423/243.01; 423/243.08; 423/244.01; 423/244.07; 422/168
(58) Field of Classification Search .............. 423/242.1, 423/243.01, 243.08, 244.01, 244.07; 422/168
See application file for complete search history.

(56) References Cited

U.S. PATENT DOCUMENTS

| | | | |
|---|---|---|---|
| 6,126,910 A | 10/2000 | Wilhelm et al. | |
| 6,303,083 B1 * | 10/2001 | Johnson et al. | 422/171 |
| 7,481,987 B2 * | 1/2009 | Maziuk, Jr. | 423/215.5 |
| 7,531,154 B2 * | 5/2009 | Maziuk, Jr. | 423/243.01 |
| 2005/0201914 A1 * | 9/2005 | Ritzenthaler | 423/230 |
| 2006/0239881 A1 * | 10/2006 | Nagayasu et al. | 423/240 R |
| 2007/0231230 A1 * | 10/2007 | Meserole et al. | 423/221 |

\* cited by examiner

*Primary Examiner*—Timothy C Vanoy
(74) *Attorney, Agent, or Firm*—Wiggin and Dana LLP; Anthony P. Gangemi

(57) ABSTRACT

A method of removing $SO_3$ from a flue gas of a boiler. The method includes the following steps: injecting chloride salts into a stream of the flue gas at a position located downstream of an air pre-heater—the position is selected so that the flue gas has a temperature at the position of substantially between 100° C. and 400° C.; reacting chloride salts with the $SO_3$ to form a sulfate-containing reaction product; and collecting the sulfate-containing reaction product in a particulate collector downstream of the boiler. A purge stream from a wet flue gas desulfurization system may be used as a source of the chloride salts. Additional chlorides may be added to the purge stream as necessary.

14 Claims, 2 Drawing Sheets

METHOD AND SYSTEM OF CONTROLLING SULFUR OXIDES IN FLUE GAS FROM COAL OR OIL-FIRED BOILERS

BACKGROUND OF THE INVENTION (1) Field of the Invention

The present invention generally relates to a method of removing sulfur oxides such as sulfur trioxide ($SO_3$) contained in flue gas from a coal or oil-fired boiler. In particular, the present invention is directed to reducing the level of $SO_3$ contained in flue gas by injecting an atomized chloride salt solution or dry chloride particulate matter continuously into the flue gas at a point downstream or upstream of an air pre-heater to absorb the $SO_3$.

(2) Description of the Related Art

Flue gases from coal and oil-fired boilers contain acid gases like sulfur dioxide ($SO_2$) and $SO_3$. $SO_2$ is gaseous under all practical conditions occurring in a plant and can be controlled by a number of different gas absorption technologies. $SO_3$ prevails in gaseous state in the gases leaving the heat recovery sections of a boiler at levels between 1 and 100 ppm by volume.

One known gas absorption technology is wet flue gas desulfurization (WFGD). In WFGD, the flue gas enters a large vessel, e.g., a spray tower or absorber, which is generally referred to as a wet scrubber, where it is sprayed with water slurry, i.e., a mixture of water and at least partially insoluble matter, e.g., lime, limestone, or the like. The calcium in the slurry reacts with the $SO_2$ to form calcium sulfite or calcium sulfate. A portion of the slurry from the reaction tank is pumped into the thickener, where the solids settle before going to a filter for final dewatering. The calcium sulfite waste product is usually mixed with fly ash and fixative lime and disposed of in landfills. Alternatively, gypsum can be produced from the WFGD waste product or the WFGD waste product may be recycled.

In actual flue gases with an appreciable content of water vapor, the $SO_3$(gas) molecules are probably associated with water molecules when the flue gas temperature has dropped down in the back-end of the boiler and exist as $H_2SO_4$(gas). On cooling of a flue gas, there is a temperature where sulfuric acid is formed from the gaseous state. This is the sulfuric acid dew point, which is a function of the partial pressures of water and $SO_3$.

Precipitated $SO_3$ has various undesirable effects. For example, heat recovery equipment must be designed to withstand the rapid corrosion caused by precipitating on cold metallic surfaces. Also, if precipitated in a flue gas plume, it contributes to opacity and mass loading in the flue gas plume emitted.

Presently, one method to reduce the undesirable effects is to inject solid alkaline particulate matter in the flue gas, such as calcium carbonate or magnesium oxide. One disadvantage of this method is that a large excess of absorbent is needed to achieve high absorption unless the admixture of the solid alkaline material is uniform throughout the flue gases. Another disadvantage of this method is that alkali consumption is high since the $SO_3$ absorption relies on comparatively slow solid-state reactions. A substantial amount of solid end product is produced using this method due to the poor utilization of the material, rendering it more difficult to collect in an electrostatic precipitator, or less suitable for reutilization.

Another method to reduce undesirable effects of precipitated $SO_3$ is to dry the sodium bisulfite solution by the heat of the flue gas and simultaneously, $SO_3$ is absorbed, sodium sulfate is produced, and $SO_2$ is released. The present methods generally fail to alleviate such issues as the high cost of sodium bisulfite and sparing availability of the material. Also, the solubility of sodium bisulfite is comparatively low; leading to that in order to inject a given amount of active material, a comparatively large amount of "ballast" water has to be injected.

BRIEF SUMMARY OF THE INVENTION

One aspect of the present application is a method of removing $SO_3$ from a flue gas of a boiler. The method includes injecting chloride salts into a stream of the flue gas at a position in a duct, the position being selected so that the flue gas has a temperature at the position between about 100° C. and 400° C.; reacting chloride salts with the $SO_3$ to form a sulfate-containing reaction product; and collecting the sulfate-containing reaction product in a particulate collector downstream of the boiler.

Another aspect of the present application is a method of removing $SO_3$ from a flue gas of a boiler. The method includes providing a purge stream from a wet flue gas desulfurization system, the purge stream containing a solution of chloride salts; injecting the solution of chloride salts into a stream of the flue gas at a position located downstream of an air pre-heater, the position being selected so that the flue gas has a temperature at the position between about 100° C. and 400° C.; reacting the solution of chloride salts with the $SO_3$ to form a sulfate-containing reaction product; and collecting the sulfate-containing reaction product in a particulate collector downstream of the boiler.

Yet another aspect of the present application is a system for removing $SO_3$ from a flue gas of a boiler. The system includes a nozzle, a means for reacting chloride salts with SO3, and a particulate collector. The nozzle is for injecting chloride salts into a stream of the flue gas at a position in a duct, the position being selected so that the flue gas has a temperature at the position between about 100° C. and 400° C. The means for reacting chloride salts with the $SO_3$ is to form a sulfate-containing reaction product. The particulate collector is for collecting the sulfate-containing reaction product downstream of the boiler.

BRIEF DESCRIPTION OF THE DRAWINGS

For the purpose of illustrating the invention, the drawings show a form of the invention that is presently preferred. However, it should be understood that the present invention is not limited to the precise arrangements and instrumentalities shown in the drawings, wherein.

DETAILED DESCRIPTION

Figure 1:
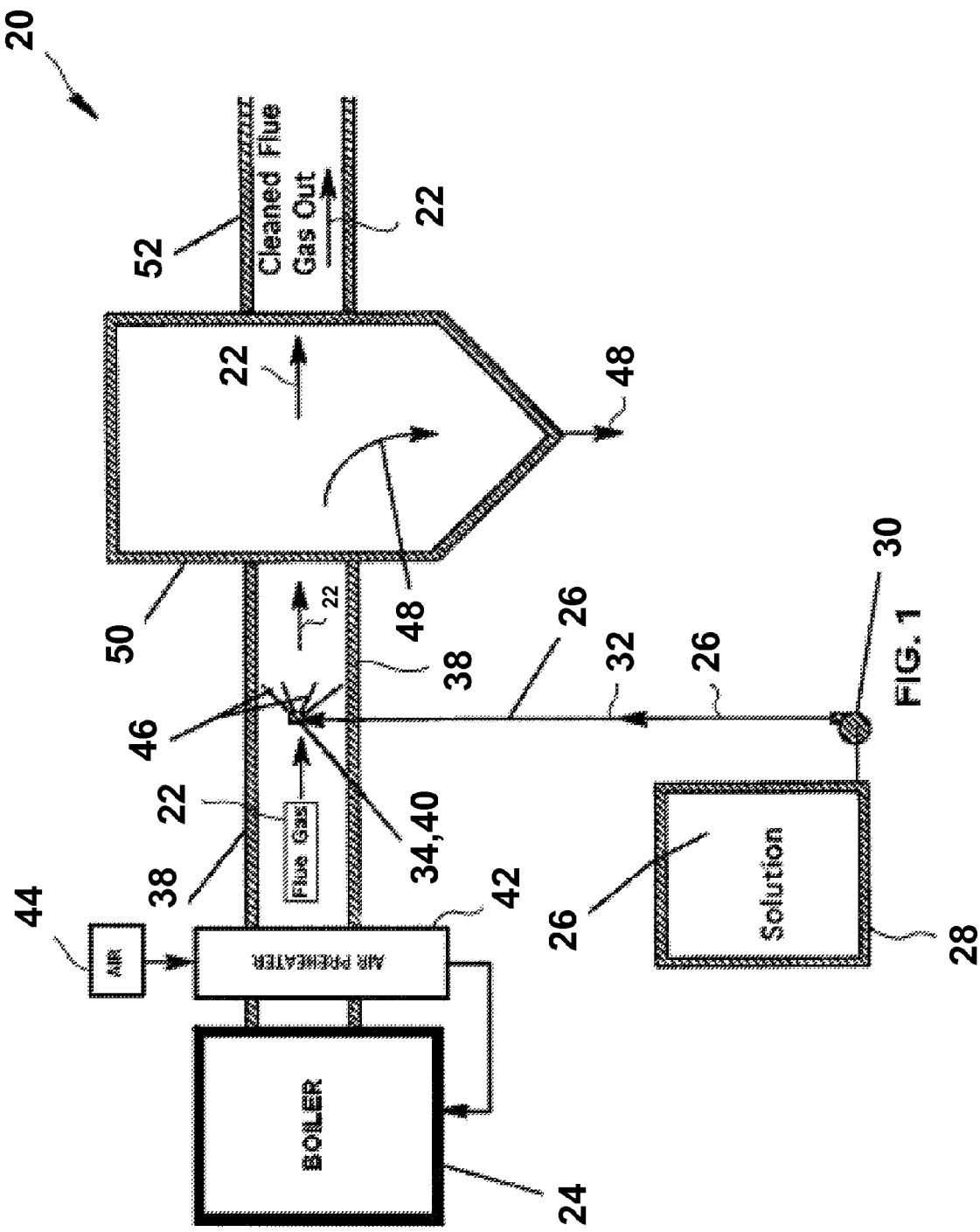
FIG. 1 is a schematic view of a system according to one embodiment of the present invention.

Referring now to the drawings, in which like reference numerals indicate like parts, and in particular, to FIG. 1, one aspect of the present invention is a method and system 20 of reducing the amount of $SO_3$ contained in a stream of flue gas 22 generated by a coal or oil-fired boiler 24. Method 20 includes injecting a solution of chloride salts 26, which are atomized, into stream of flue gas 22 to absorb $SO_3$ contained in the flue gas.

First, in method 20, solution of chloride salts 26 is atomized and injected into stream of flue gas 22. Typically, atomization of stream of flue gas 22 occurs as it is being injected. Solution of chloride salts 26 is typically contained in a tank 28 prior to injection. Solution of chloride salts 26 may include but is not limited to concentrated solutions of sodium, potassium, calcium, or magnesium chlorides. Solution of chloride salts 26 is typically pumped from tank 28 using a pump 30 and injected into to stream of flue gas 22 via a pipe 32 and atomizing spray nozzles 34. Alternatively, dry chloride salts may be added to flue gas 22. Stream of flue gas 22 comes from a boiler 24 and is first contained in a duct 38. Solution of chloride salts 26 are injected into stream of flue gas 22 at a position 40 along duct 38 that is downstream of an air pre-heater 42. Generally, a plurality of atomizing spray nozzles 34 are arranged in duct 38 and through the nozzles, solution of chloride salts 26 is atomized and injected in stream of flue gas 22. Air pre-heater 42 is used to pre-heat an air stream 44 that is fed to boiler 24 via heat transfer from stream of flue gas 22. At the same time, flue gas 22 is cooled. Position 40 of the injection is selected where flue gas 22 has a temperature between about 100° C. and 400° C.

Next, after solution of chloride salts 26 is injected into stream of flue gas 22, spray droplets 46 are formed. Spray droplets 46 are dried out rapidly by the heat of stream of flue gas 22 before they impact a surface of duct 38. As spray droplets 46 dry out, the chlorides present react with the gaseous $SO_3$ present, thereby forming a sulfate-containing reaction product 48 and a hydrogen chloride gas (not shown). Sulfate-containing reaction product 48 is then collected in a particulate collector 50, i.e., a bag house or similar, located downstream of boiler 24. Sulfate-containing reaction product 48 is removed from particulate collector 50 and discarded and the remainder of stream of flue gas 22 continues through a cleaned flue duct 52. The cleaned stream of flue gas 22 exits the system via cleaned flue duct 52 and is typically exhausted into the atmosphere through a conventional stack (not shown) or is subjected to additional processes such as scrubbing.

Figure 2:
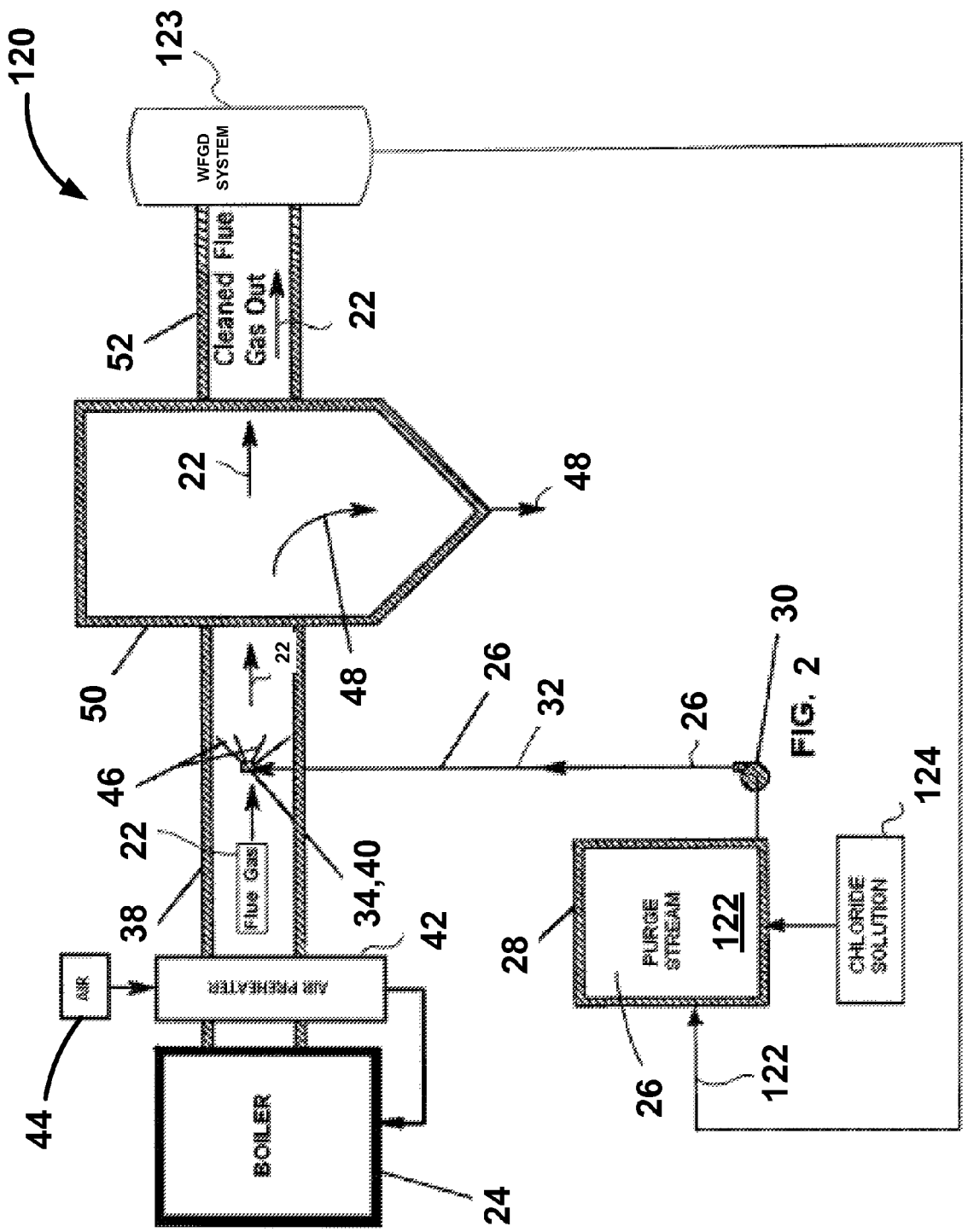
FIG. 2 is a schematic view of a system according to another embodiment of the present invention.

Referring now to FIG. 2, another embodiment of the present invention includes a method 120. With the exceptions of the differences described below, method 120 is substantially similar to or identical to method 20 as indicated by similar or identical element numbers. As in the description of method 20, with respect to method 120, stream of flue gas 22 refers to any flue gas and the particular constituents that make-up the flue gas are expected to vary as the flue gas is treated. One way method 120 differs from method 20 is that a purge stream 122 from a wet flue gas desulfurization system 123, which is described above, is used as a source for solution of chloride salts 26. If necessary, an additional chloride solution 124 may be added to purge stream 122 to increase the level of chlorides so that less water is required to achieve desired $SO_3$ absorption levels.

A method of controlling $SO_3$ according to the present invention offers advantages over prior art designs in that instead of costly sodium sulfite, low cost chlorides of sodium, potassium, calcium, iron, or magnesium are used. These compounds are readily available and in many cases, the source is recycled waste material. In addition, the hydrogen chloride gases produced by the present invention generally do not have the same deleterious effects as $SO_3$ and typically do not precipitate to liquid form.

Additionally, in plants equipped with wet lime or limestone base flue gas desulfurization that produce gypsum, calcium chloride has to be continuously purged to the wastewater system. A particular advantage of the present invention is that the purge stream can be used as feedstock for material to be injected.

Although the invention has been described and illustrated with respect to exemplary embodiments thereof, it should be understood by those skilled in the art that the foregoing and various other changes, omissions and additions may be made therein and thereto, without parting from the spirit and scope of the present invention. Accordingly, other embodiments are within the scope of the following claims.

What is claimed is:

1. A method of removing SO3 from a flue gas of a boiler, comprising:
   injecting dry chloride salts into a stream of the flue gas at a position in a duct, said position being selected so that the flue gas has a temperature at said position of as low as about 100° C. or as high as about 400° C.;
   reacting dry chloride salts with the SO3 to form a sulfate-containing reaction product; and
   collecting said sulfate-containing reaction product in a particulate collector downstream of the boiler.

2. A method according to claim 1, wherein said position is located either upstream or downstream of an air pre-heater.

3. A method according to claim 1, wherein said dry chloride salts are one of sodium chloride, potassium chloride, calcium chloride, magnesium chloride, and a combination thereof.

4. A method according to claim 1, wherein the boiler is a coal or oil fired boiler.

5. A method according to claim 1, wherein said particulate collector is a bag house.

6. A method according to claim 1, wherein said dry chloride salts are obtained from a purge stream from a wet flue gas desulfurization system.

7. A method according to claim 6, further comprising:
   processing said purge stream to increase its chloride content.

8. A method of removing SO3 from a flue gas of a boiler, comprising:
   providing a purge stream from a wet flue gas desulfurization system, said purge stream containing a solution of chloride salts;
   injecting dry solid chloride salts obtained from said solution of chloride salts into a stream of the flue gas at a position located downstream of an air pre-heater, said position being selected so that the flue gas has a temperature at said position of as low as about 100° C. or as high as about 400° C.;

reacting said dry solid chloride salts with the SO3 to form a sulfate-containing reaction product; and collecting said sulfate-containing reaction product in a particulate collector downstream of the boiler.

9. A method according to claim 8, wherein said dry solid chloride salts are one of sodium chloride, potassium chloride, calcium chloride, magnesium chloride, and a combination thereof.

10. A method according to claim 8, wherein the boiler is a coal or oil fired boiler.

11. A system for removing SO3 from a flue gas of a boiler, comprising:

a supply of dry solid chloride salts;

a nozzle for injecting said dry solid chloride salts into a stream of the flue gas at a position in a duct, said position being selected so that the flue gas has a temperature at said position of as low as about 100° C. or as high as about 400° C.;

means for reacting said dry solid chloride salts with the SO3 to form a sulfate-containing reaction product; and a particulate collector for collecting said sulfate-containing reaction product downstream of the boiler.

12. A system according to claim 11, wherein said position is located either upstream or downstream of an air pre-heater.

13. A system according to claim 11, wherein said dry solid chloride salts are one of sodium chloride, potassium chloride, calcium chloride, magnesium chloride, and a combination thereof.

14. A system according to claim 11, wherein said dry solid chloride salts are obtained from a purge stream from a wet flue gas desulfurization system.

* * * * *